United States Patent
Elie et al.

(10) Patent No.: US 10,809,934 B2
(45) Date of Patent: Oct. 20, 2020

(54) NAND DIRECT ACCESS HORIZONTAL QUEUE

(71) Applicant: Intel Corporation, Santa Clara, CA (US)

(72) Inventors: Etienne Elie, El Dorado Hills, CA (US); John Rudelic, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/215,807

(22) Filed: Dec. 11, 2018

(65) Prior Publication Data
US 2019/0114106 A1    Apr. 18, 2019

(51) Int. Cl.
*G06F 3/06*    (2006.01)
(52) U.S. Cl.
CPC .......... *G06F 3/0647* (2013.01); *G06F 3/0604* (2013.01); *G06F 3/0613* (2013.01); *G06F 3/0656* (2013.01); *G06F 3/0659* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 7,027,415 B1* | 4/2006 | Dahlby | ............... | H04L 41/0896 370/322 |
| 8,874,835 B1* | 10/2014 | Davis | .................... | G06F 3/0679 711/103 |
| 2012/0166749 A1* | 6/2012 | Eleftheriou | ........... | G06F 3/0616 711/165 |
| 2014/0379715 A1* | 12/2014 | Kesselman | ............. | G06F 3/067 707/737 |
| 2016/0299697 A1* | 10/2016 | Chen | ..................... | G06F 3/0611 |
| 2017/0220586 A1* | 8/2017 | Zuckerman | ............. | G06F 21/60 |
| 2017/0285729 A1* | 10/2017 | Yang | ....................... | G06F 1/183 |
| 2019/0303024 A1* | 10/2019 | Iwai | ..................... | G06F 3/0679 |

OTHER PUBLICATIONS

"Open-Channel Solid State Drives NVMe Specification", LightNVM, Apr. 2016, 24 pages, Revision 1.2.

* cited by examiner

*Primary Examiner* — Elias Mamo
(74) *Attorney, Agent, or Firm* — Jordan IP Law, LLC

(57) ABSTRACT

An embodiment of a semiconductor apparatus may include technology to determine if data can be placed in a first data location in a persistent storage media based on a host-provided first data placement policy, and then based on the determination, place the data in the first data location, or place the data in a second data location in the persistent storage media based on a host-provided second data placement policy, and subsequently relocate the data from the second data location to the first data location. Other embodiments are disclosed and claimed.

20 Claims, 10 Drawing Sheets

NAND DIRECT ACCESS HORIZONTAL QUEUE

TECHNICAL FIELD

Embodiments generally relate to memory and storage systems. More particularly, embodiments relate to a NAND direct access horizontal queue.

BACKGROUND

A persistent storage device, such as a solid state drive (SSD), may include media such as NAND memory. Some SSDs may provide access for a host to some internal features of the SSD. The OPEN-CHANNEL SSD (OCSSD) 2.0 specification (lightnvm.io) may describe such host-managed features.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory (NVM). Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NVM may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

Figure 1:
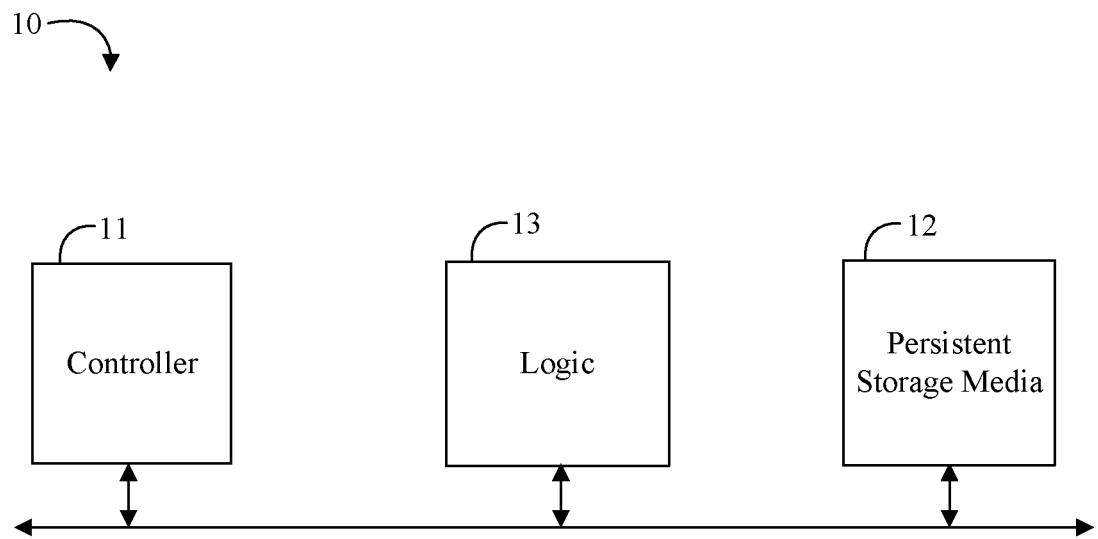
FIG. 1 is a block diagram of an example of an electronic storage system according to an embodiment.

Turning now to FIG. 1, an embodiment of an electronic storage system 10 may include a controller 11, persistent storage media 12 communicatively coupled to the controller 11, and logic 13 communicatively coupled to the controller 11 to determine if data can be placed in a first data location in the persistent storage media 12 based on a host-provided first data placement policy, and then based on the determination, place the data in the first data location, or place the data in a second data location in the persistent storage media 12 based on a host-provided second data placement policy, and subsequently relocate the data from the second data location to the first data location. In some embodiments, the logic 13 may be configured to provide a first queue to relocate the data from the second data location to the first data location. The logic 13 may also be configured to relocate the data from the second data location to the first data location in a background media management operation. In some embodiments, the logic 13 may be configured to provide a deep input queue, provide a shallow queue between the deep input queue and the persistent storage media 12, and map items in the deep input queue to the shallow queue based on one or more of the first data policy and the second data policy. For example, the logic 13 may be configured to associate the deep input queue with one or more of an application and a tenant, and map items in the deep input queue to the shallow queue based on channel utilization. In any of the embodiments herein, the persistent storage media 12 may comprise NAND media and the logic 13 may be further configured to isolate data from multiple tenants and share a channel between two or more of the multiple tenants. In some embodiments, the logic 13 may be located in, or co-located with, various components, including the controller 11 (e.g., on a same die).

Embodiments of each of the above controller 11, persistent storage media 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 11 may include a general purpose controller, a special purpose controller, a storage controller, a memory controller, a micro-controller, a processor, a central processor unit (CPU), etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C # or the like and conventional procedural programming languages, such as the "C" programming language or similar programming languages. For example, the persistent storage media 12, or other system memory may store a set of instructions which when executed by the controller 11 cause the system 10 to implement one or more components, features, or aspects of the system 10 (e.g., the logic 13, determining where to place data based on the host-provided data placement policies, relocating the data from the second data location to the first data location, etc.).

Figure 2:
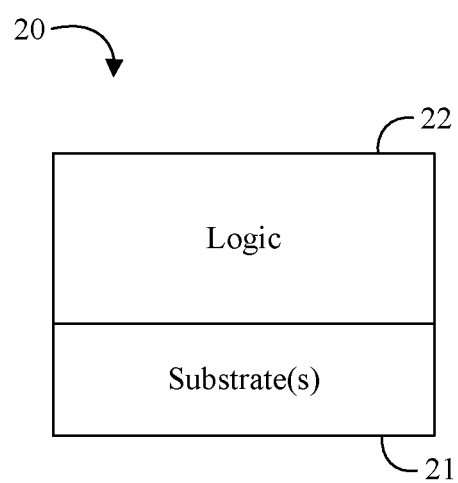
FIG. 2 is a block diagram of an example of a semiconductor apparatus according to an embodiment.

Turning now to FIG. 2, an embodiment of a semiconductor apparatus 20 for use with a persistent storage media may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to determine if data can be placed in a first data location in the persistent storage media based on a host-provided first data placement policy, and then based on the determination, place the data in the first data location, or place the data in a second data location in the persistent storage media based on a host-provided second data placement policy, and subsequently relocate the data from the second data location to the first data location. In some embodiments, the logic 22 may be configured to provide a first queue to relocate the data from the second data location to the first data location. The logic 22 may also be configured to relocate the data from the second data location to the first data location in a background media management operation. In some embodiments, the logic 22 may be configured to provide a deep input queue, provide a shallow queue between the deep input queue and the persistent storage media, and map items in the deep input queue to the shallow queue based on one or more of the first data policy and the second data policy. For example, the logic 22 may be configured to associate the deep input queue with one or more of an application and a tenant, and map items in the deep input queue to the shallow queue based on channel utilization. In any of the embodiments herein, the persistent storage media may comprise NAND media and the logic 22 may be further configured to isolate data from multiple tenants and share a channel between two or more of the multiple tenants. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

The apparatus 20 may implement one or more aspects of the method 25 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
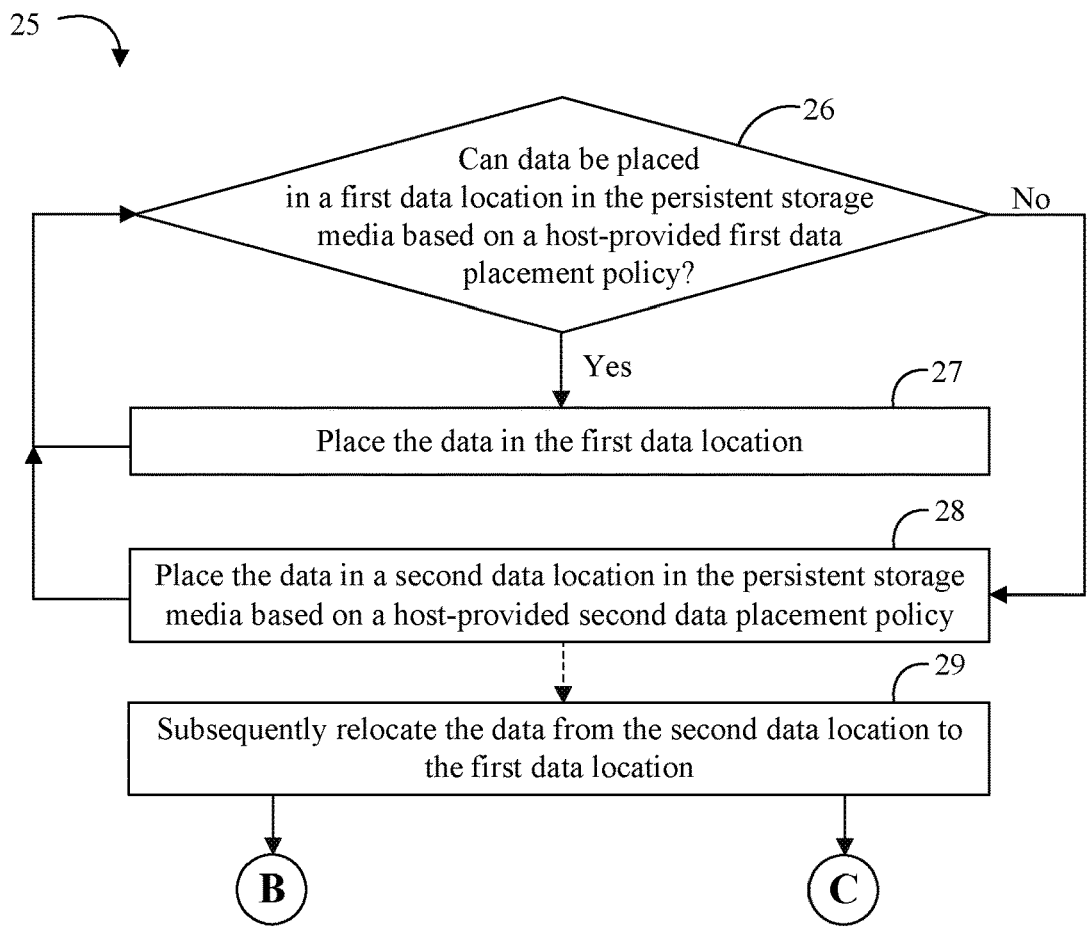
FIGS. 3A to 3C are flowcharts of an example of a method of controlling storage according to an embodiment.
Figure 3B:
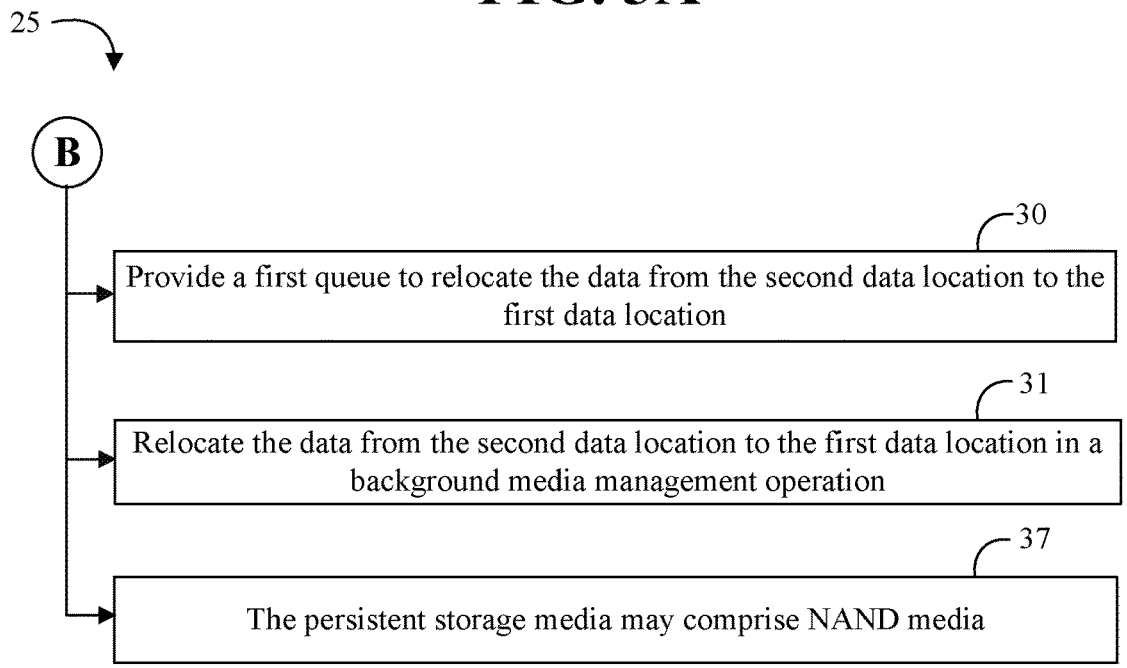
Figure 3C:
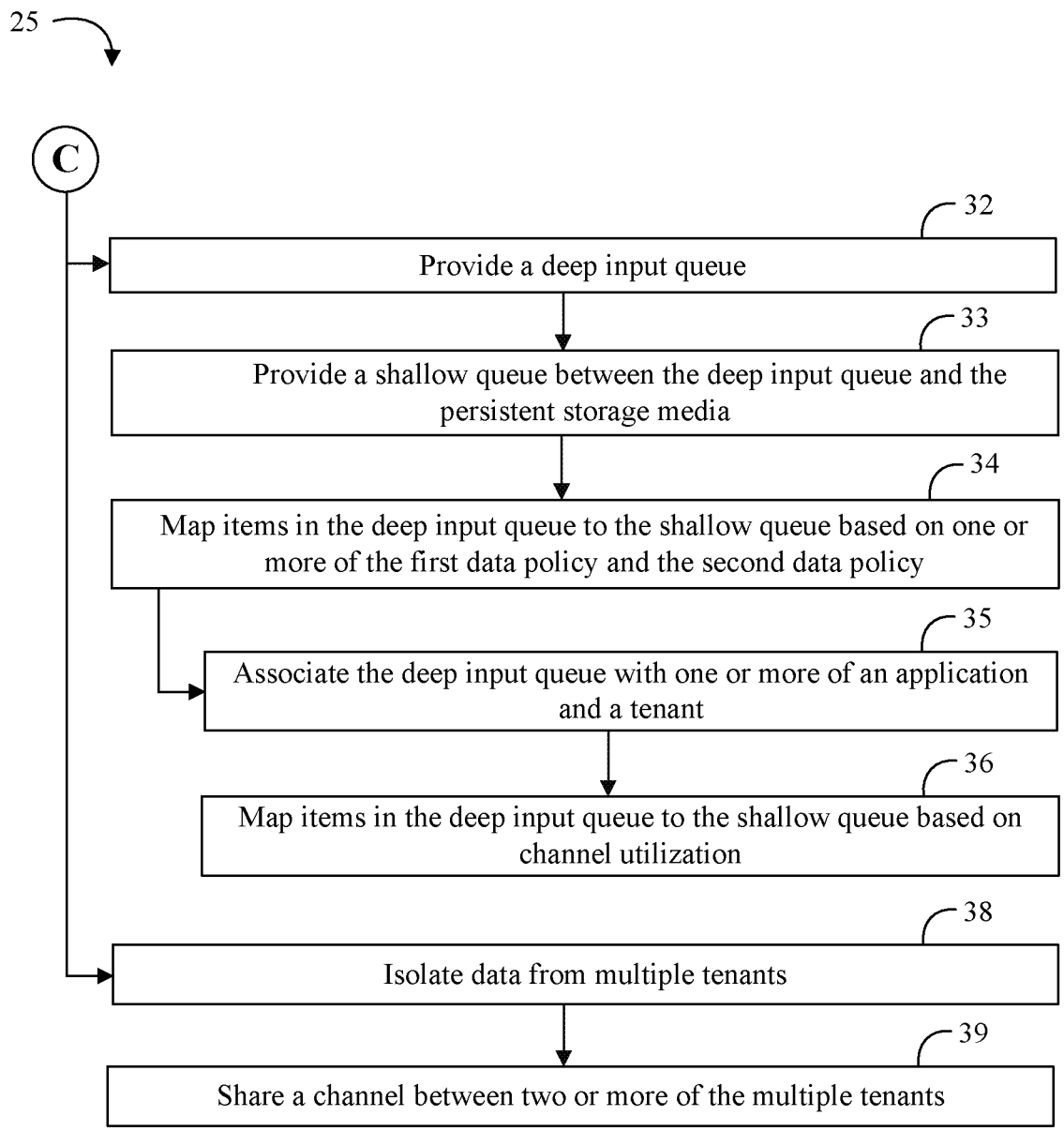

Turning now to FIGS. 3A to 3C, an embodiment of a method 25 of controlling storage may include determining if data can be placed in a first data location in the persistent storage media based on a host-provided first data placement policy at block 26, and then based on the determination, placing the data in the first data location at block 27, or placing the data in a second data location in the persistent storage media based on a host-provided second data placement policy at block 28, and subsequently relocating the data from the second data location to the first data location at block 29. Some embodiments of the method 25 may include providing a first queue to relocate the data from the second data location to the first data location at block 30, and/or relocating the data from the second data location to the first data location in a background media management operation at block 31. Some embodiments of the method 25 may include providing a deep input queue at block 32, providing a shallow queue between the deep input queue and the persistent storage media at block 33, and mapping items in the deep input queue to the shallow queue based on one or more of the first data policy and the second data policy at block 34. For example, the method 25 may include associating the deep input queue with one or more of an application and a tenant at block 35, and mapping items in the deep input queue to the shallow queue based on channel utilization at block 36. In any of the embodiments herein, the persistent storage media may comprise NAND media at block 37. The method 25 may also include isolating data from multiple tenants at block 38, and sharing a channel between two or more of the multiple tenants at block 39.

Embodiments of the method 25 may be implemented in a system, apparatus, computer, device, etc., for example, such as those described herein. More particularly, hardware implementations of the method 25 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 25 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

For example, the method 25 may be implemented on a computer readable medium as described in connection with Examples 21 to 27 below. Embodiments or portions of the method 25 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide NAND direct access horizontal queueing technology. Some SSDs may provide direct access to the NAND die that makeup the SSD. For example, SSDs compatible with the OCSSD may include such direct access features. In some systems, a file translation layer (FTL) may be moved from within the drive to the host subsystem, which allows the host fine-grained control of physical data placement within the available NAND die. In contrast, some conventional SSDs include an opaque FTL internal to the drive and the host may have no input to physically place data among the available NAND die. Data set management (DSM) hints, streams, and input/output (IO)-determinism may also be utilized to provide more fine-grained control and share more information with the FTL. A problem with SSDs that provide the host direct access to the NAND die is that there still may be several constraints (e.g., available channels, NAND die, blocks, and pages) that may potentially block a desired or optimal data placement.

Some embodiments may advantageously provide technology to allow a host to temporarily place data in a less desired or sub-optimal physical location with a guarantee that the data will eventually be placed in the desired/optimal location. Advantageously, temporarily placing data in a sub-optimal location may improve performance by more fully leveraging any available/idle channels/NAND die/blocks/pages/etc. in the less desired/sub-optimal location. In some embodiments, the data will eventually be scrubbed by a background task (e.g., background data refresh (BDR), erase dwell time count (EDTC), garbage collection (GC), etc.) and will then be relocated to the desired/optimal physical location. As used herein, optimal is a nominal term for any strategy a host prefers (e.g., co-location of tenant data, random address scrambling, etc.) and may have different meanings in various circumstances/implementations.

Some embodiments may advantageously provide improved or optimal NAND performance (e.g., an ability to use more or all NAND channels) for a stream of IO operations that would otherwise result in a loss of performance. As described in more detail herein, some embodiments may utilize horizontal queue technology that will relocate data to the desired/optimal location as a part of the natural NAND media management process. For performance reasons, for example, data may initially be placed in a less-desired/sub-optimal location (e.g., relative to some host/tenant/application criteria). As data is regularly and/or continuously moved as a result of NAND media management operations (e.g., BDR, EDTC, etc.), the data may be moved from a sub-optimal location to an optimal location. When an open block is padded out with dummy data to close the block, for example, some embodiments may advantageously take the opportunity to pad out the block with valid data from a prior sub-optimal location.

Figure 4A:
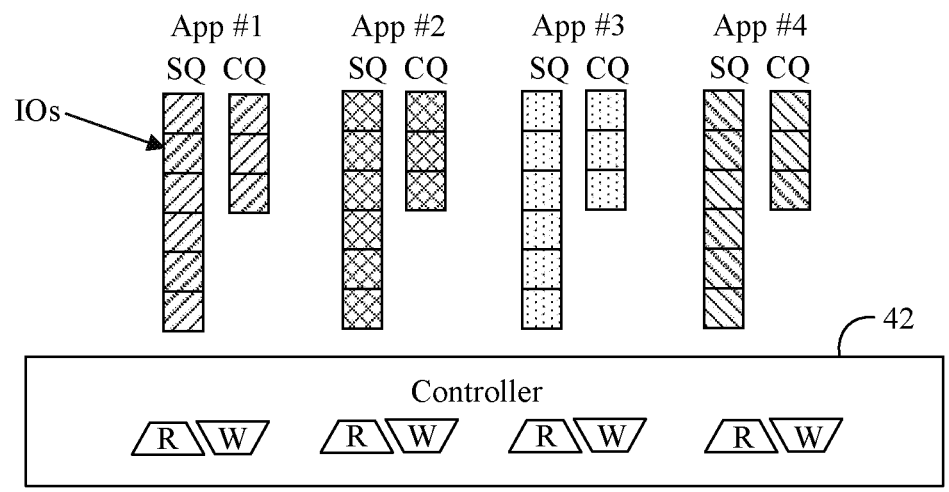
FIGS. 4A to 4B are block diagrams of another example of an electronic storage system according to an embodiment.
Figure 4A:
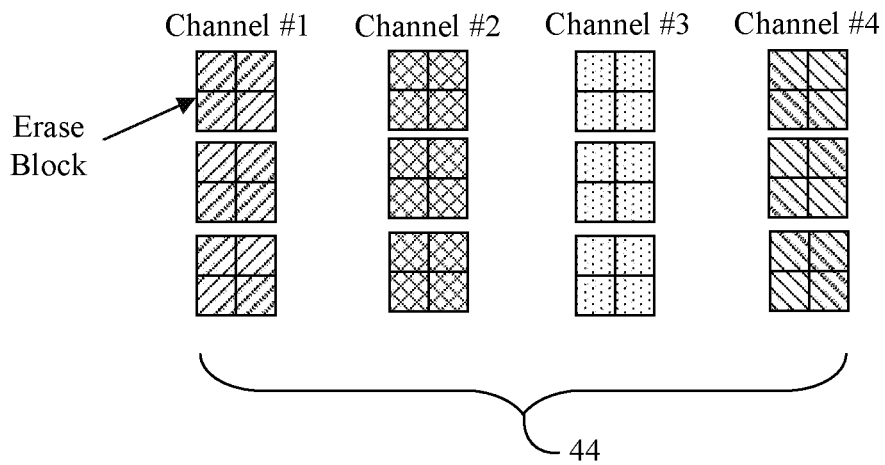
Figure 4B:
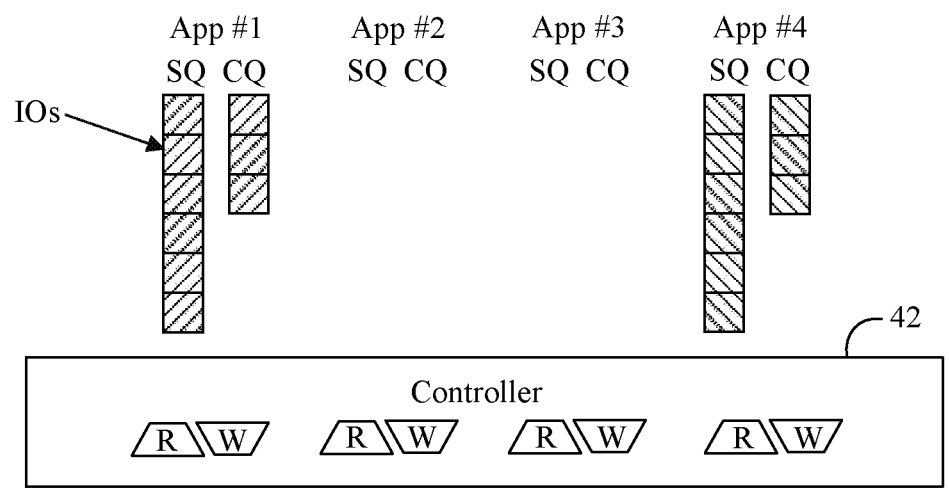
Figure 4B:
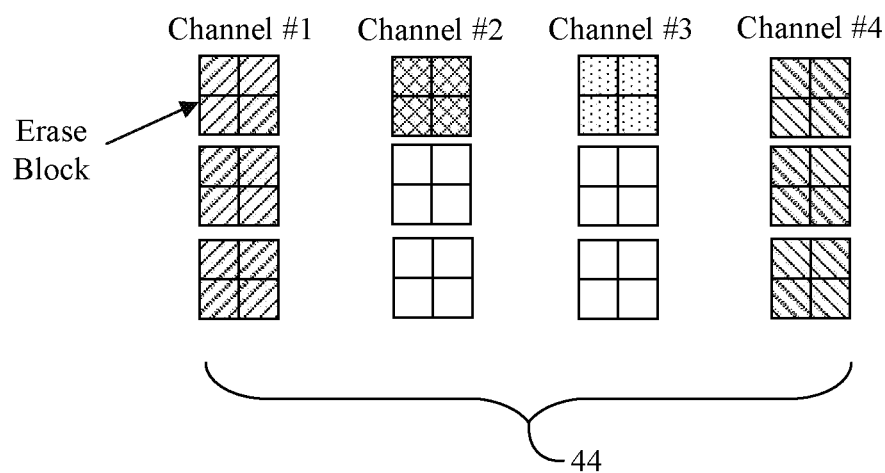

Turning now to FIGS. 4A to 4B, an embodiment of an electronic storage system 40 may include two or more submission queues (SQs) and completion queues (CQs) respectively associated with two or more applications (e.g., App #1 through App #4). The storage system 40 may include a controller 42 to control read/write (R/W) access to NAND media 44 via two or more channels (e.g., Channel #1 through Channel #4). The NAND media 44 may be organized in erase blocks (EBs). As described above, OCSSD-compatible SSDs may provide the opportunity for host software to more ideally place tenant data for quality-of-service (QoS) and/or data isolation benefits. The host has access to all of the available information for a desired isolation. With 4 tenants (e.g., or applications), for example, the host may want to isolate data such that 25% of the available NAND is assigned to each tenant. For an example four channel storage system (e.g., as shown in FIGS. 4A to 4B), the host may simply assign a dedicated channel to each application to provide the desired isolation and storage sharing arrangement such that each of the 4 tenants have 25% of the available NAND. This arrangement may work well and efficiently when all 4 tenants are actively scheduling IO to the storage system 40 (e.g., see FIG. 4A).

A problem with this arrangement may occur when some of the tenants or applications do not have any outstanding requests. If only 2 of the 4 tenants have outstanding requests, for example, then the performance of the system drops to 50% of optimal. FIG. 4B shows applications/tenants 1 and 4 with multiple IO requests and applications/tenants 2 and 3 with a single IO request. The illustrated example physical arrangement for isolation will result in an instantaneous reduction in performance of 50% for the currently queued IO requests because there is no IO to be scheduled for Channel #2 and Channel #3 because the associated applications/tenants are not currently posting IO to the storage system 40. Under this example scenario, only Channel #1 and Channel #4 will process 10 resulting in a commensurate drop of 50% in performance.

Figure 5:
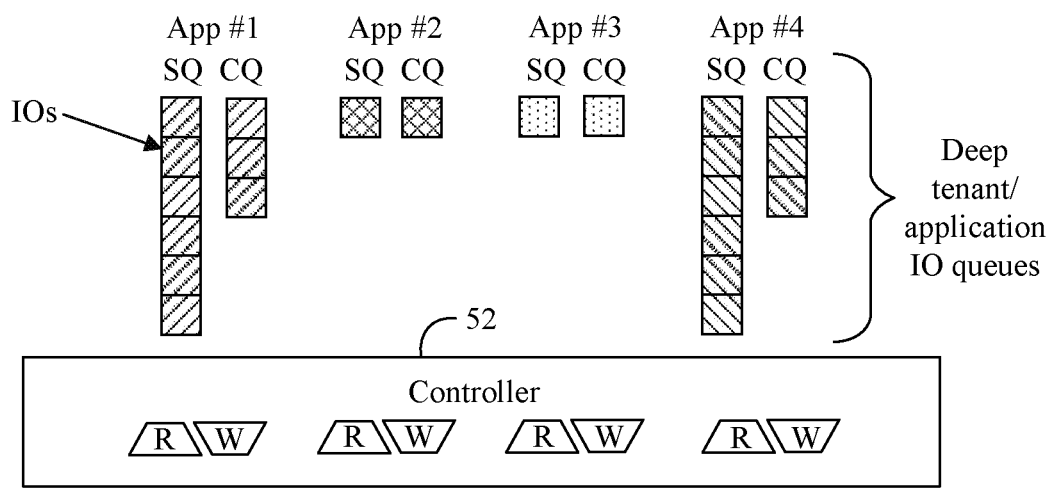
FIG. 5 is a block diagram of another example of an electronic storage system according to an embodiment.
Figure 5:
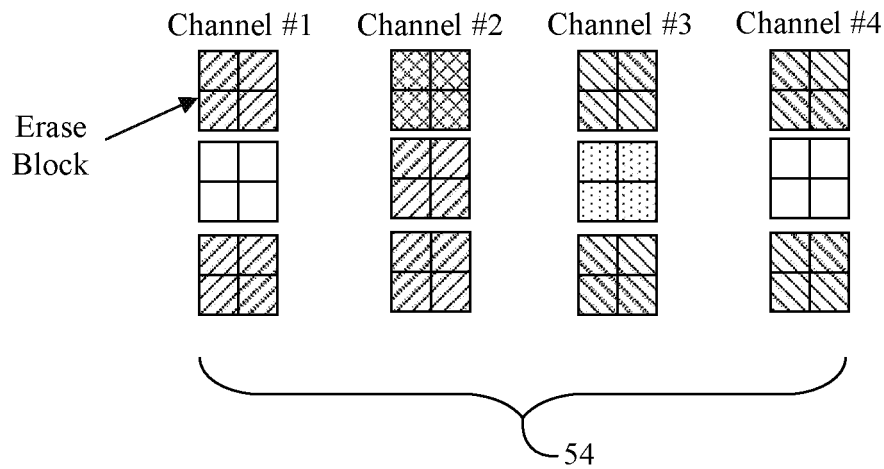

Turning now to FIG. 5, an embodiment of an electronic storage system 50 may include two or more submission queues (SQs) and completion queues (CQs) respectively associated with two or more applications (e.g., App #1 through App #4). The storage system 50 may include a controller 52 to control read/write (R/W) access to NAND media 54 via two or more channels (e.g., Channel #1 through Channel #4). The NAND media 54 may be organized in erase blocks (EBs). Some embodiments of the system 50 may advantageously include technology to allow the host to temporarily place data in a sub-optimal location. For this example, optimal location may be to physically isolate the tenant data into 25% of the available NAND. FIG. 5 utilizes different hatch patterns to show data associated with the respective applications/tenants sub-optimally written to the other applications/tenants' preferred channels (e.g., because the preferred channels for the originating applications/tenants were unavailable to write to). Advantageously, by utilizing non-preferred channels, the performance for processing the IO requests is improved.

Figure 6:
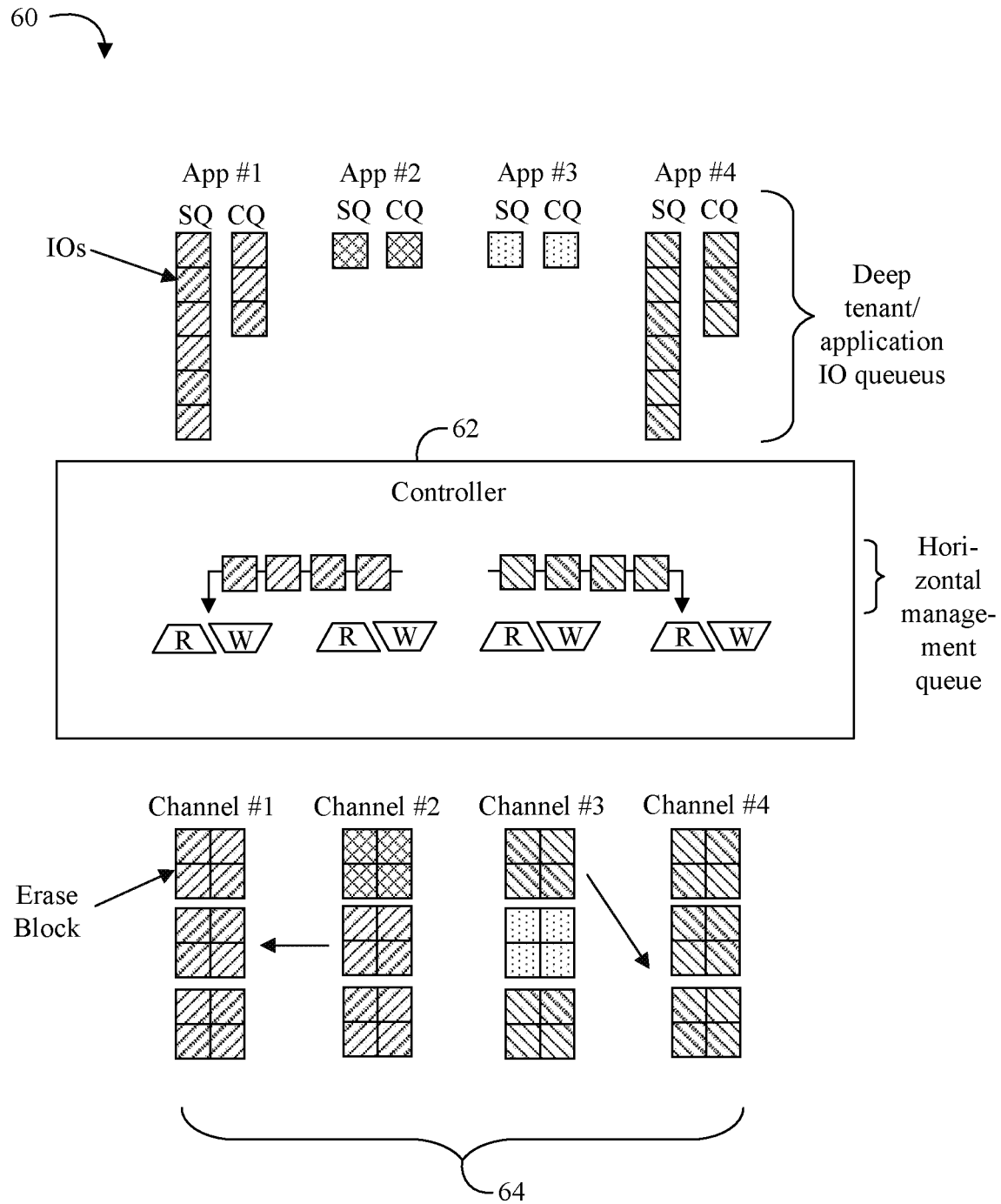
FIG. 6 is a block diagram of another example of an electronic storage system according to an embodiment.

Turning now to FIG. 6, an embodiment of an electronic storage system 60 may include two or more submission queues (SQs) and completion queues (CQs) respectively associated with two or more applications (e.g., App #1 through App #4). The storage system 60 may include a controller 62 to control read/write (R/W) access to NAND media 64 via two or more channels (e.g., Channel #1 through Channel #4). The NAND media 64 may be organized in erase blocks (EBs). Some embodiments of the system 60 may advantageously include technology to move the data from the suboptimal location to the optimal location. For example, the controller 62 may include horizontal management queue technology to move data between the channels. In this example, vertical data placement may refer to data placed from the input queues into the NAND media 64 via the channels, while horizontal data placement may refer to data moved from NAND media associated with one of the channels to another NAND media associated with another channel. Those skilled in the art will appreciate that the terms "vertical" and "horizontal" are used only nominally to simplify the description. For example, data may be regularly/continuously moved as a result of NAND media management operations (e.g., BDR, EDTC, etc.). The data may be marked or identified to be moved from the less desired/sub-optimal location to the more-desired/optimal location. Additionally, data may be moved when an open block is padded out with dummy data to close the block.

The examples of FIG. 4A to FIG. 6 utilizes physical data isolation among four tenants across four channels as an "optimal" data placement policy, while a secondary data placement policy permits utilizing idle channels for temporarily allowing a "sub-optimal" data location to improve IO performance. Those skilled in the art will appreciate that numerous other primary and secondary (or more) data policies may be utilized for different applications/tenants. Another example "optimal" data placement policy may include data address randomization for read performance. Whatever the optimal/primary data placement policy, some embodiments advantageously provide a secondary/temporary data placement policy (e.g., sub-optimal as compared to the optimal physical location of data) configured such that the data will eventually be relocated as part of the natural NAND media management techniques, and this natural movement provides an opportunity to land the data in the optimal location eventually. For example, the temporary/secondary data placement policy may be applied when the optimal location is unavailable, but an alternate location is available. Some embodiments advantageously improve system performance while allowing the system to eventually converge on the optimal state. Those skilled in the art will appreciate that a data placement policy may be implemented as a set of logic, software, firmware, configurations, settings, etc. to cause the storage system to manage the IO as desired. Various aspects of the data placement policy or policies may be managed by the host, and various other aspects may be communicated from the host to the storage system.

Some embodiments may further provide NAND direct access IO queueing technology. As discussed above, a SSD may be configured to provide a host/tenant/application direct access to the NAND die, allowing fine grained physical control of data placement where the host can guarantee that four tenants are physically isolated by allocating 25% of the NAND die to each tenant. As discussed in connection with FIGS. 4A to 4B, one issue with a fixed allocation of 25% of the NAND die to each of four tenants is that the performance for each tenant may be limited to one quarter of the available throughput. Some embodiments may advantageously provide queueing technology that preserves isolation while also supporting improved or maximum throughput for a single tenant if available.

Some embodiments may provide a two stage IO queueing mechanism that supports the ability to perfectly isolate NAND data while simultaneously supporting maximum IO performance. For example, some embodiments may include a deep input queue per tenant/application in front of a shallow queue to the NAND channels. Items in the deep queue may be mapped to the shallow queue for optimal performance across the available NAND channels. Advantageously, some embodiments may provide improved or optimal NAND performance (e.g. using all available NAND channels for performance to multiple tenants) while simultaneously preserving data isolation in separate erase blocks, for data IO operations that otherwise could result in a loss of performance.

Figure 7:
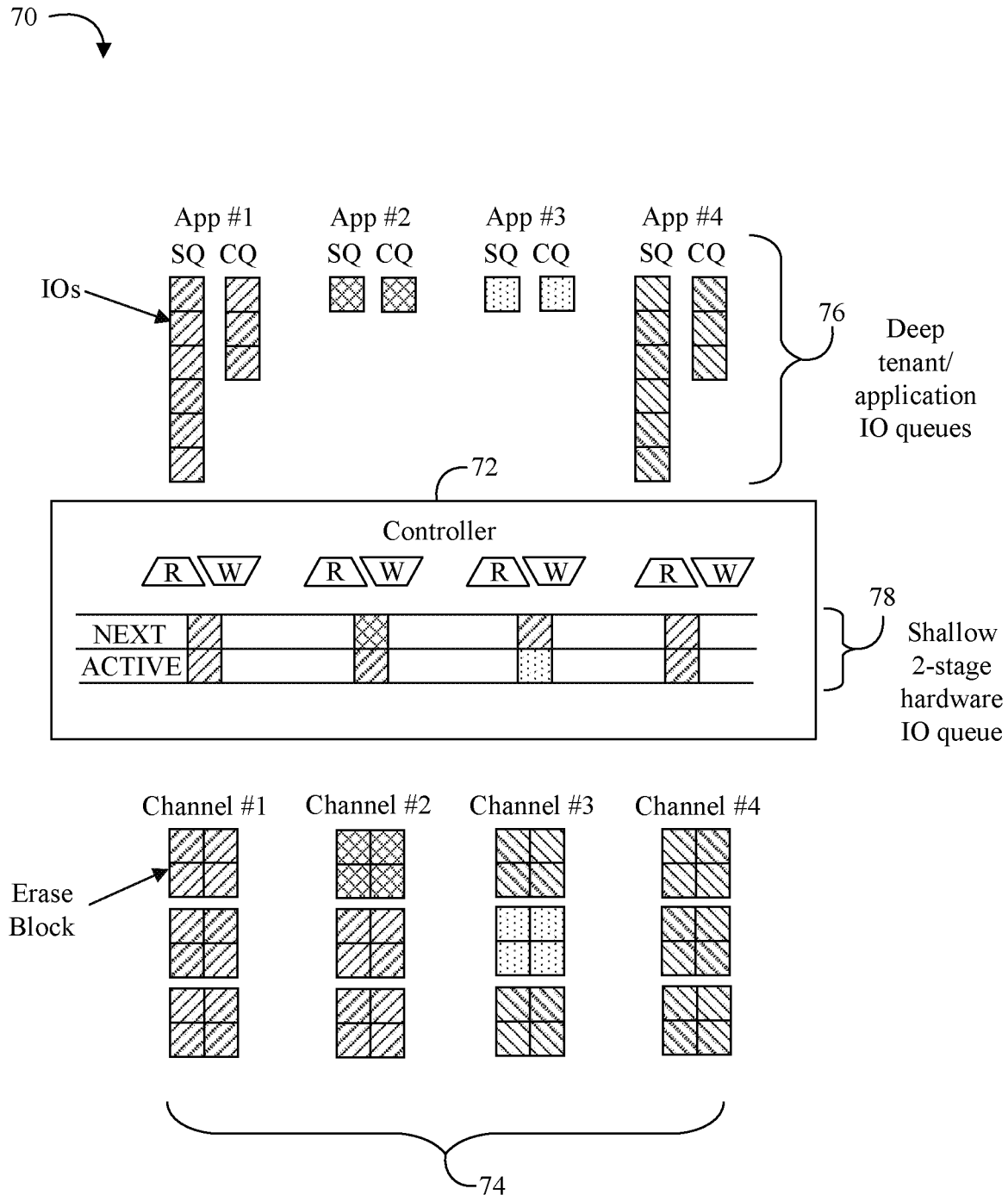
FIG. 7 is a block diagram of another example of an electronic storage system according to an embodiment.

Turning now to FIG. 7, an electronic storage system 70 may include two or more submission queues (SQs) and completion queues (CQs) respectively associated with two or more applications (e.g., App #1 through App #4). The storage system 70 may include a controller 72 to control read/write (R/W) access to NAND media 74 via two or more channels (e.g., Channel #1 through Channel #4). The NAND media 74 may be organized in erase blocks (EBs). Some embodiments of the system 70 may advantageously include technology to separate the tenant/application IO queues into two stages. A first stage may include a deep queue 76 for the application to submit requests. A second stage to the IO queueing may include a shallow queue 78 before the IO controller 72. In this example, the application or tenants post IOs to the application queue(s), the controller 72 then selects the IO to allow the controller 72 to use any available NAND channel and to keep the NAND channels as busy as possible.

In some embodiments, it may be preferred for the application queue(s) to be as deep as possible. Deep application queues may help the system to consistently keep the NAND busy. When one of the applications stops submitting IO, then there may be a mismatch and in some other systems one or more channels will be unused and NAND will be idle, resulting in a loss of performance. Some embodiments advantageously add a shallow two-stage pipeline to the deep application queue. The shallow two-stage hardware queue may select IO from each of the four tenants when available. If one or more of the tenants do not have IO scheduled, then the two-stage hardware queue will schedule an IO from a different tenant, thereby keeping all NAND channels and NAND die as busy as possible for improved or maximum IO performance. Advantageously, some embodiments may achieve improved or maximum performance in the presence of idle tenant/applications, and also maintain physical isolation by isolating tenant data to separate EBs.

Advantageously, some embodiments of the two-stage hardware IO queue may defer the decision regarding the next set of IO to a later time or the last possible instant while allowing flexibility to schedule for maximum performance and maintaining physical isolation of tenant data. Traditional SSDs may attempt to maximize IO operations to fully utilize all channels, but a traditional SSD does not have access to the information that the host software does regarding host goals for each specific IO. Some embodiments of a OCSSD-compatible SSD (e.g., or similar SSD), where the scheduling may be fully controlled by the host software, may further utilize the deep application queue and the shallow two-stage hardware queue (e.g., scheduling the two-stage queue may also be part of the host software) to provide flexibility that would otherwise not be achievable with conventional storage systems.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 8:
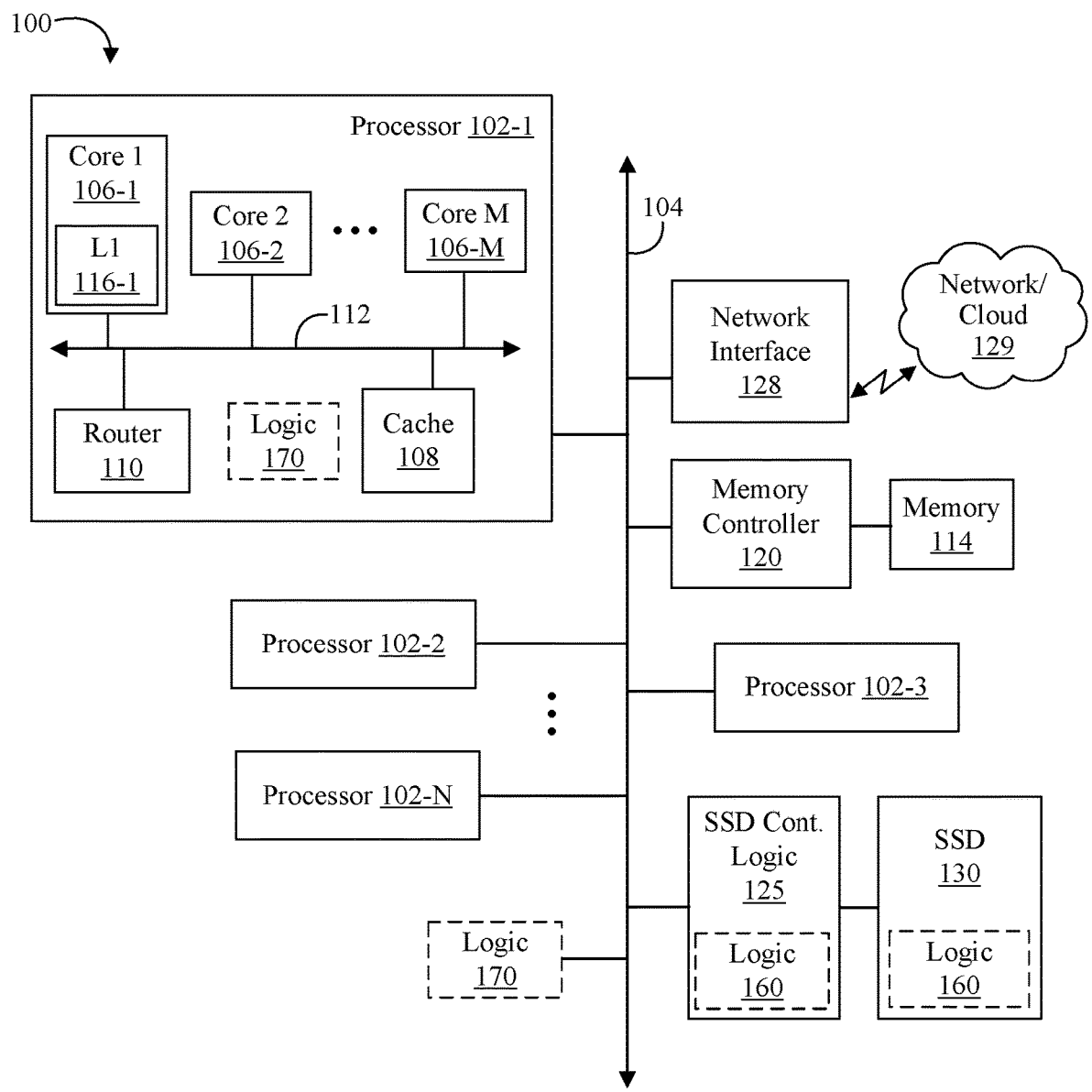
FIG. 8 is a block diagram of an example of a computing system according to an embodiment.

Turning now to FIG. 8, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 170, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 8, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 8, memory 114 may be coupled to other components of system 100 through a memory controller 120. Memory 114 may include volatile memory and may be interchangeably referred to as main memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include Non-Volatile (NV) storage device such as a SSD 130 coupled to the interconnect 104 via SSD controller logic 125. Hence, logic 125 may control access by various components of system 100 to the SSD 130. Furthermore, even though logic 125 is shown to be directly coupled to the interconnection 104 in FIG. 8, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc. Additionally, logic 125 may be incorporated into memory controller logic (such as those discussed with reference to FIG. 9) or provided on a same integrated circuit (IC) device in various embodiments (e.g., on the same IC device as the SSD 130 or in the same enclosure as the SSD 130). The SSD 130 may be OCSSD-compatible, or may otherwise include technology to allow a host/tenant/application direct access to the NAND die and/or more fine-grained control of data placement.

Furthermore, logic 125 and/or SSD 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, SSD 130, SSD bus, SATA bus, logic 125, logic 160, etc., to sense variations in various factors affecting power/thermal behavior of the system/platform, such as temperature, operating frequency, operating voltage, power consumption, and/or inter-core communication activity, etc.

As illustrated in FIG. 8, SSD 130 may include logic 160, which may be in the same enclosure as the SSD 130 and/or fully integrated on a printed circuit board (PCB) of the SSD 130. The system 100 may include further logic 170 outside of the SSD 130. Advantageously, the logic 160 and/or logic 170 may include technology to implement one or more aspects of the method 25 (FIGS. 3A to 3C). For example, the logic 160 and/or the logic 170 may include technology to determine if data can be placed in a first data location in the SSD 130 based on a host-provided first data placement policy, and then based on the determination, place the data in the first data location, or place the data in a second data location in the SSD 130 based on a host-provided second data placement policy, and subsequently relocate the data from the second data location to the first data location. In some embodiments, the logic 160/170 may be configured to provide a first queue to relocate the data from the second data location to the first data location. The logic 160/170 may also be configured to relocate the data from the second data location to the first data location in a background media management operation. In some embodiments, the logic 160/170 may be configured to provide a deep input queue, provide a shallow queue between the deep input queue and the persistent storage media, and map items in the deep input queue to the shallow queue based on one or more of the first data policy and the second data policy. For example, the logic 160/170 may be configured to associate the deep input queue with one or more of an application and a tenant, and map items in the deep input queue to the shallow queue based on channel utilization. In any of the embodiments herein, the SSD 130 may comprise NAND media and the logic 160/170 may be further configured to isolate data from multiple tenants and share a channel between two or more of the multiple tenants. For example, the logic 170 may include technology to implement the host device/computer system/agent aspects of the various embodiments described herein (e.g., requesting information from the SSD 130, communicating data policies to the SSD 130, etc.).

In other embodiments, the SSD 130 may be replaced with any suitable persistent storage technology/media. In some embodiments, the logic 160/170 may be coupled to one or more substrates (e.g., silicon, sapphire, gallium arsenide, printed circuit board (PCB), etc.), and may include transistor channel regions that are positioned within the one or more substrates. As shown in FIG. 8, features or aspects of the logic 160 and/or the logic 170 may be distributed throughout the system 100, and/or co-located/integrated with various components of the system 100.

Figure 9:
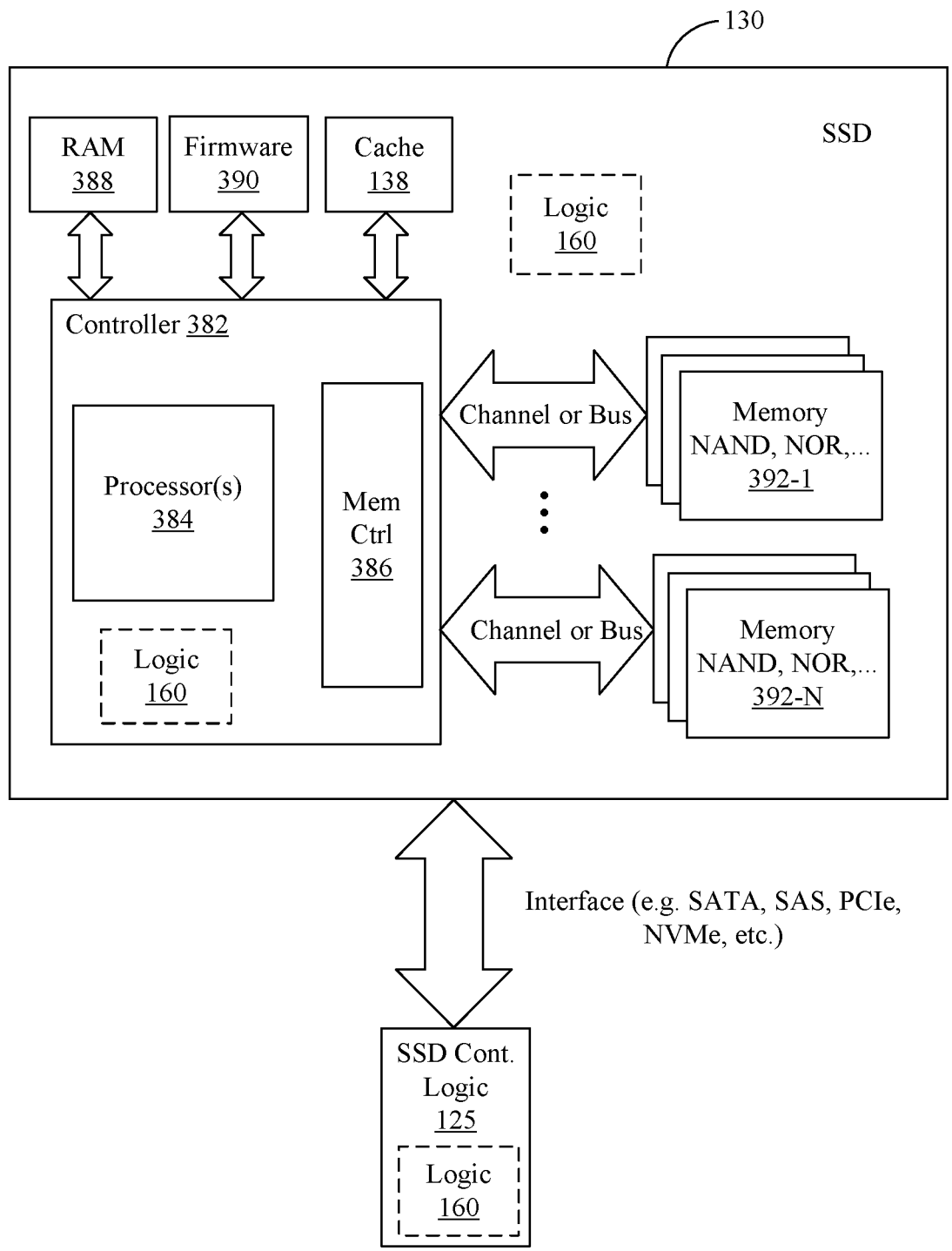
FIG. 9 is a block diagram of an example of a SSD according to an embodiment.

FIG. 9 illustrates a block diagram of various components of the SSD 130, according to an embodiment. As illustrated in FIG. 9, logic 160 may be located in various locations such as inside the SSD 130 or controller 382, etc., and may include similar technology as discussed in connection with FIG. 8. SSD 130 includes a controller 382 (which in turn includes one or more processor cores or processors 384 and memory controller logic 386), cache 138, RAM 388, firmware storage 390, and one or more memory modules or dies 392-1 to 392-N (which may include NAND flash, NOR flash, or other types of non-volatile memory). Memory modules 392-1 to 392-N are coupled to the memory controller logic 386 via one or more memory channels or busses. Also, SSD 130 communicates with logic 125 via an interface (such as a SATA, SAS, PCIe, NVMe, etc., interface). One or more of the features/aspects/operations discussed with reference to FIGS. 1-8 may be performed by one or more of the components of FIG. 9. Processors 384 and/or controller 382 may compress/decompress (or otherwise cause compression/decompression of) data written to or read from memory modules 392-1 to 392-N. Also, one or more of the features/aspects/operations of FIGS. 1-8 may be programmed into the firmware 390. Further, SSD controller logic 125 may also include logic 160.

Additional Notes and Examples

Example 1 includes a semiconductor apparatus for use with a persistent storage media, comprising one or more substrates, and logic coupled to the one or more substrates, wherein the logic is at least partly implemented in one or more of configurable logic and fixed-functionality hardware logic, the logic coupled to the one or more substrates to determine if data can be placed in a first data location in the persistent storage media based on a host-provided first data placement policy, and then based on the determination, place the data in the first data location, or place the data in a second data location in the persistent storage media based on a host-provided second data placement policy, and subsequently relocate the data from the second data location to the first data location.

Example 2 includes the apparatus of Example 1, wherein the logic is further to provide a first queue to relocate the data from the second data location to the first data location.

Example 3 includes the apparatus of any of Examples 1 to 2, wherein the logic is further to relocate the data from the second data location to the first data location in a background media management operation.

Example 4 includes the apparatus of any of Examples 1 to 3, wherein the logic is further to provide a deep input queue, provide a shallow queue between the deep input queue and the persistent storage media, and map items in the deep input queue to the shallow queue based on one or more of the first data policy and the second data policy.

Example 5 includes the apparatus of Example 4, wherein the logic is further to associate the deep input queue with one or more of an application and a tenant, and map items in the deep input queue to the shallow queue based on channel utilization.

Example 6 includes the apparatus of any of Examples 1 to 5, wherein the persistent storage media comprises NAND media.

Example 7 includes the apparatus of any of Examples 1 to 6, wherein the logic coupled to the one or more substrates includes transistor channel regions that are positioned within the one or more substrates.

Example 8 includes an electronic storage system, comprising a controller, persistent storage media communicatively coupled to the controller, and logic communicatively coupled to the controller to determine if data can be placed in a first data location in the persistent storage media based on a host-provided first data placement policy, and then based on the determination, place the data in the first data location, or place the data in a second data location in the persistent storage media based on a host-provided second data placement policy, and subsequently relocate the data from the second data location to the first data location.

Example 9 includes the system of Example 8, wherein the logic is further to provide a first queue to relocate the data from the second data location to the first data location.

Example 10 includes the system of any of Examples 8 to 9, wherein the logic is further to relocate the data from the second data location to the first data location in a background media management operation.

Example 11 includes the system of any of Examples 8 to 10, wherein the logic is further to provide a deep input queue, provide a shallow queue between the deep input queue and the persistent storage media, and map items in the deep input queue to the shallow queue based on one or more of the first data policy and the second data policy.

Example 12 includes the system of Example 11, wherein the logic is further to associate the deep input queue with one or more of an application and a tenant, and map items in the deep input queue to the shallow queue based on channel utilization.

Example 13 includes the system of any of Examples 8 to 12, wherein the persistent storage media comprises NAND media.

Example 14 includes a method of controlling storage, comprising determining if data can be placed in a first data location in the persistent storage media based on a host-provided first data placement policy, and then based on the determination, placing the data in the first data location, or placing the data in a second data location in the persistent storage media based on a host-provided second data placement policy, and subsequently relocating the data from the second data location to the first data location.

Example 15 includes the method of Example 14, further comprising providing a first queue to relocate the data from the second data location to the first data location.

Example 16 includes the method of any of Examples 14 to 15, further comprising relocating the data from the second data location to the first data location in a background media management operation.

Example 17 includes the method of any of Examples 14 to 16, further comprising providing a deep input queue, providing a shallow queue between the deep input queue and the persistent storage media, and mapping items in the deep input queue to the shallow queue based on one or more of the first data policy and the second data policy.

Example 18 includes the method of Example 17, further comprising associating the deep input queue with one or more of an application and a tenant, and mapping items in the deep input queue to the shallow queue based on channel utilization.

Example 19 includes the method of any of Examples 14 to 18, wherein the persistent storage media comprises NAND media.

Example 20 includes the method of any of Examples 14 to 19, further comprising isolating data from multiple tenants, and sharing a channel between two or more of the multiple tenants.

Example 21 includes at least one computer readable storage medium, comprising a set of instructions, which when executed by a computing device, cause the computing device to determine if data can be placed in a first data location in the persistent storage media based on a host-provided first data placement policy, and then based on the determination, place the data in the first data location, or place the data in a second data location in the persistent storage media based on a host-provided second data placement policy, and subsequently relocate the data from the second data location to the first data location.

Example 22 includes the at least one computer readable storage medium of Example 21, comprising a further set of instructions, which when executed by the computing device, cause the computing device to provide a first queue to relocate the data from the second data location to the first data location.

Example 23 includes the at least one computer readable storage medium of any of Examples 21 to 22, comprising a further set of instructions, which when executed by the computing device, cause the computing device to relocate the data from the second data location to the first data location in a background media management operation.

Example 24 includes the at least one computer readable storage medium of any of Examples 21 to 23, comprising a further set of instructions, which when executed by the computing device, cause the computing device to provide a deep input queue, provide a shallow queue between the deep input queue and the persistent storage media, and map items in the deep input queue to the shallow queue based on one or more of the first data policy and the second data policy.

Example 25 includes the at least one computer readable storage medium of Example 24, comprising a further set of instructions, which when executed by the computing device, cause the computing device to associate the deep input queue with one or more of an application and a tenant, and map items in the deep input queue to the shallow queue based on channel utilization.

Example 26 includes the at least one computer readable medium storage medium of any of Examples 21 to 25, wherein the persistent storage media comprises NAND media.

Example 27 includes the at least one computer readable storage medium of any of Examples 21 to 26, comprising a further set of instructions, which when executed by the computing device, cause the computing device to isolate data from multiple tenants, and share a channel between two or more of the multiple tenants.

Example 28 includes a storage controller apparatus, comprising means for determining if data can be placed in a first data location in the persistent storage media based on a host-provided first data placement policy, and then based on the determination, means for placing the data in the first data location, or means for placing the data in a second data location in the persistent storage media based on a host-provided second data placement policy, and means for subsequently relocating the data from the second data location to the first data location.

Example 29 includes the apparatus of Example 28, further comprising means for providing a first queue to relocate the data from the second data location to the first data location.

Example 30 includes the apparatus of any of Examples 28 to 29, further comprising means for relocating the data from the second data location to the first data location in a background media management operation.

Example 31 includes the apparatus of any of Examples 28 to 30, further comprising means for providing a deep input queue, means for providing a shallow queue between the deep input queue and the persistent storage media, and means for mapping items in the deep input queue to the shallow queue based on one or more of the first data policy and the second data policy.

Example 32 includes the apparatus of Example 31, further comprising means for associating the deep input queue with one or more of an application and a tenant, and means for mapping items in the deep input queue to the shallow queue based on channel utilization.

Example 33 includes the apparatus of any of Examples 128 to 32, wherein the persistent storage media comprises NAND media.

Example 34 includes the apparatus of any of Examples 28 to 33, further comprising means for isolating data from multiple tenants, and means for sharing a channel between two or more of the multiple tenants.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus for use with a persistent storage media, comprising:
one or more substrates; and
logic coupled to the one or more substrates, wherein the logic is at least partly implemented in one or more of configurable logic and fixed-functionality hardware logic, the logic coupled to the one or more substrates to:
determine whether data can be placed in a first data location in the persistent storage media based on a host-provided first data placement policy,
place the data in the first data location in response to a determination that the data can be placed in the first data location, wherein the host-provided first data placement policy places the data in the first data location as a preferred location when the preferred location is available,
place the data in a second data location in the persistent storage media based on a host-provided second data placement policy in response to a determination that the data cannot be placed in the first data location, wherein the host-provided second data placement policy initially places the data in the second data location as a non-preferred temporary location when the preferred location is not available and marks the data for relocation, and
subsequently relocate the data marked for relocation from the second data location to the first data location.

2. The apparatus of claim 1, wherein the logic is further to:
provide a first queue to relocate the data from the second data location to the first data location.

3. The apparatus of claim 2, wherein the logic is further to:
relocate the data from the second data location to the first data location in a background media management operation.

4. The apparatus of claim 1, wherein the logic is further to:
provide a deep input queue;
provide a shallow queue between the deep input queue and the persistent storage media; and
map items in the deep input queue to the shallow queue based on one or more of the first data placement policy and the second data placement policy.

5. The apparatus of claim 4, wherein the logic is further to:
associate the deep input queue with one or more of an application and a tenant; and
map items in the deep input queue to the shallow queue based on channel utilization.

6. The apparatus of claim 1, wherein the persistent storage media comprises NAND media.

7. The apparatus of claim 1, wherein the logic coupled to the one or more substrates includes transistor channel regions that are positioned within the one or more substrates.

8. An electronic storage system, comprising:
a controller;
persistent storage media communicatively coupled to the controller; and
logic communicatively coupled to the controller to:
determine whether data can be placed in a first data location in the persistent storage media based on a host-provided first data placement policy,
place the data in the first data location in response to a determination that the data can be placed in the first data location, wherein the host-provided first data placement policy places the data in the first data location as a preferred location when the preferred location is available,
place the data in a second data location in the persistent storage media based on a host-provided second data placement policy in response to a determination that the data cannot be placed in the first data location, wherein the host-provided second data placement policy initially places the data in the second data location as a non-preferred temporary location when the preferred location is not available and marks the data for relocation, and subsequently relocate the data marked for relocation from the second data location to the first data location.

9. The system of claim 8, wherein the logic is further to:
provide a first queue to relocate the data from the second data location to the first data location.

10. The system of claim 9, wherein the logic is further to:
relocate the data from the second data location to the first data location in a background media management operation.

11. The system of claim 8, wherein the logic is further to:
provide a deep input queue;
provide a shallow queue between the deep input queue and the persistent storage media; and
map items in the deep input queue to the shallow queue based on one or more of the first data placement policy and the second data placement policy.

12. The system of claim 11, wherein the logic is further to:
associate the deep input queue with one or more of an application and a tenant; and
map items in the deep input queue to the shallow queue based on channel utilization.

13. The system of claim 8, wherein the persistent storage media comprises NAND media.

14. A method of controlling storage, comprising:
determining whether data can be placed in a first data location in a persistent storage media based on a host-provided first data placement policy;
placing the data in the first data location in response to a determination that the data can be placed in the first data location, wherein the host-provided first data placement policy places the data in the first data location as a preferred location when the preferred location is available;
placing the data in a second data location in the persistent storage media based on a host-provided second data placement policy in response to a determination that the data cannot be placed in the first data location, wherein the host-provided second data placement policy initially places the data in the second data location as a non-preferred temporary location when the preferred location is not available and marks the data for relocation; and
subsequently relocating the data marked for relocation from the second data location to the first data location.

15. The method of claim 14, further comprising:
providing a first queue to relocate the data from the second data location to the first data location.

16. The method of claim 15, further comprising:
relocating the data from the second data location to the first data location in a background media management operation.

17. The method of claim 14, further comprising:
providing a deep input queue;
providing a shallow queue between the deep input queue and the persistent storage media; and
mapping items in the deep input queue to the shallow queue based on one or more of the first data placement policy and the second data placement policy.

18. The method of claim 17, further comprising:
associating the deep input queue with one or more of an application and a tenant; and
mapping items in the deep input queue to the shallow queue based on channel utilization.

19. The method of claim 14, wherein the persistent storage media comprises NAND media.

20. The method of claim 19, further comprising:
isolating data from multiple tenants; and
sharing a channel between two or more of the multiple tenants.

* * * * *